(12) United States Patent
Pelton et al.

(10) Patent No.: US 8,116,719 B2
(45) Date of Patent: *Feb. 14, 2012

(54) TECHNIQUES FOR DETERMINING COMMUNICATION STATE USING ACCELEROMETER DATA

(75) Inventors: Gregory Pelton, Raleigh, NC (US); Billy Moon, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/788,243

(22) Filed: May 26, 2010

(65) Prior Publication Data

US 2010/0235527 A1 Sep. 16, 2010

Related U.S. Application Data

(63) Continuation of application No. 11/052,020, filed on Feb. 5, 2005, now Pat. No. 7,764,641.

(51) Int. Cl.
*H04M 11/00* (2006.01)
(52) U.S. Cl. .......... 455/403; 455/456.1; 455/404.2; 455/556.2; 455/425; 370/539.13; 370/539.23; 370/568.1
(58) Field of Classification Search .......... 455/403, 455/456.1–457, 404.2, 41.2, 556.2, 90.1–90.3, 455/425; 370/539.13, 539.23, 568.1
See application file for complete search history.

(56) References Cited

U.S. PATENT DOCUMENTS

| 5,517,618 A | 5/1996 | Wada et al. |
|---|---|---|
| 5,634,010 A | 5/1997 | Ciscon et al. |
| 5,941,955 A | 8/1999 | Wilby et al. |
| 6,067,460 A | 5/2000 | Alanara et al. |
| 6,172,986 B1 | 1/2001 | Watanuki et al. |
| 6,327,594 B1 | 12/2001 | Van Huben et al. |
| 6,377,793 B1 | 4/2002 | Jenkins |
| 6,480,713 B2 | 11/2002 | Jenkins |
| 6,490,460 B1 | 12/2002 | Soliman |
| 6,522,266 B1 | 2/2003 | Soehren et al. |
| 6,542,925 B2 | 4/2003 | Brown et al. |

(Continued)

FOREIGN PATENT DOCUMENTS

CN 2006800016643 11/2005

(Continued)

OTHER PUBLICATIONS

J. Chae et al., A Monolithic Three-axis Silicon Capacitive Accelerometer with Micro-g Resolution, /~jcahe/pdf/Trans03.pdf, Jan. 5, 2005, Publisher: University of Michigan: www.eecs.umich.edu, Published in: Internet.

(Continued)

*Primary Examiner* — Kamran Afshar
*Assistant Examiner* — Yousef Rod
(74) *Attorney, Agent, or Firm* — Stolowitz Ford Cowger LLP

(57) ABSTRACT

Techniques for communicating with a user on a network include receiving acceleration data that indicates acceleration of a mobile network node associated with a user of a network. A communication state for the user is determined based at least in part on the acceleration data. The communication state indicates a type of network communication suitable for communicating with the user. Network communications with the user are based on the communication state. Among other uses, such techniques allow a network communicating with a human through a mobile node carried by the human to infer from stopped or unusual motions when the human's ability to receive or act on communications is impaired or otherwise affected.

26 Claims, 4 Drawing Sheets

U.S. PATENT DOCUMENTS

| | | |
|---|---|---|
| 6,587,882 B1 | 7/2003 | Inoue et al. |
| 6,665,677 B1 | 12/2003 | Wotring et al. |
| 6,681,107 B2 | 1/2004 | Jenkins et al. |
| 6,711,740 B1 | 3/2004 | Moon |
| 6,748,233 B1 | 6/2004 | Arnold et al. |
| 6,763,013 B2 | 7/2004 | Kennedy |
| 6,763,014 B2 | 7/2004 | Kennedy |
| 6,763,369 B1 | 7/2004 | Ytuarte et al. |
| 6,765,892 B1 | 7/2004 | Leung et al. |
| 7,085,576 B2 | 8/2006 | Ranganathan |
| 7,130,773 B1 | 10/2006 | Wong |
| 7,363,024 B2 | 4/2008 | Jenkins |
| 7,519,733 B1 | 4/2009 | Thubert et al. |
| 7,549,145 B2 | 6/2009 | Aguilar et al. |
| 7,664,119 B2 | 2/2010 | Adams et al. |
| 7,706,977 B2 * | 4/2010 | Soehren ............... 701/215 |
| 7,733,882 B2 | 6/2010 | Furukawa et al. |
| 7,764,641 B2 * | 7/2010 | Pelton et al. ........... 370/328 |
| 2003/0129995 A1 | 7/2003 | Niwa et al. |
| 2004/0014567 A1 | 1/2004 | Mendel |
| 2004/0024886 A1 | 2/2004 | Saxena |
| 2004/0030571 A1 | 2/2004 | Solomon |
| 2004/0057409 A1 | 3/2004 | Kennedy |
| 2004/0134336 A1 | 7/2004 | Solomon |
| 2004/0139049 A1 | 7/2004 | Hancock et al. |
| 2004/0192347 A1 * | 9/2004 | Leizerovich et al. ...... 455/456.1 |
| 2004/0192352 A1 | 9/2004 | Vallstrom et al. |
| 2004/0252397 A1 * | 12/2004 | Hodge et al. ................ 360/60 |
| 2005/0060364 A1 * | 3/2005 | Kushwaha et al. ........... 709/200 |
| 2005/0060365 A1 | 3/2005 | Robinson et al. |
| 2005/0068169 A1 | 3/2005 | Copley et al. |
| 2005/0076054 A1 | 4/2005 | Moon et al. |
| 2005/0106941 A1 | 5/2005 | Witchey |
| 2005/0171876 A1 | 8/2005 | Golden |
| 2006/0025154 A1 | 2/2006 | Alapuranen et al. |
| 2006/0112418 A1 | 5/2006 | Bantz et al. |
| 2006/0188327 A1 | 8/2006 | Moon |
| 2006/0206898 A1 | 9/2006 | Miner et al. |
| 2007/0086425 A1 | 4/2007 | Leow et al. |
| 2008/0126403 A1 | 5/2008 | Moon |

FOREIGN PATENT DOCUMENTS

| | | |
|---|---|---|
| EP | 1168715 | 1/2002 |
| EP | 1351174 | 10/2003 |
| EP | 2006735385 | 11/2007 |
| GB | 2375006 | 10/2002 |
| IN | 4778DELNP2007 | 8/2007 |
| WO | WO2006/091493 | 8/2006 |

OTHER PUBLICATIONS

MEMS Accelerometer Technology Report, /techn.html, Jan. 5, 2005, Publisher: Silicon Designs: www.silicondesigns.com, Published in: Internet.

Johnson et al., "Mobility Support in IPv6", Internet Draft, IETF Mobile IP Working Group, draft-ietfmobileip-ipv6-24.txt, Jun. 30, 2003, http://www.iettorg/internetdrafts/draft-ietf-mobileip-ipv6-24.txt.

Object Management Group, "OMG Unified Modeling Language Specification", Version 1.5, Mar. 2003, http://www.omg.org/docs/formal/03-03-01.pdf.

Burden, "Routing the Internet", (online), Jan. 17, 1999, (retrieved Apr. 11, 2006), retrieved from www.scit.wlv.ac.uk/.about.jphb/comms/iproute.html, pp. 1-8.

Sibley et al., "Robomote: A Tiny Mobile Robot Platform for Large-Scale Ad-Hoc Sensor Networks", May 2002, Proceedings of the 2002 IEEE International Conference on Robotics & Automation, p. 1143-1148.

Written Opinion of the International Searching Authority for International Application No. PCT/US06/05696, Nov. 23, 2007.

Affens, David W., "Emergency Beacon Development", Aug. 30, 2004, http://searchandrescue.gsfc.nasa.gov/techdevelopment/beacons.htm, 2 pgs.

Rinard, Martin C., "Operating Systems Lecture Notes, Lecture 6, CPU Scheduling", Aug. 25, 1998, http://williamstallings.com/Extras/OS-Notes/h6.html.

Linux Devices, "Basic concepts of real-time operating systems", Nov. 18, 2003, http://linuxdevices.com/articles/AT4627965573.html.

Balakrishnan et al., "Looking Up Data in P2P Systems", 5 pgs., Feb. 2003.

Naor et al., "Novel Architectures for P2P Applications: the Continuous-Discrete Approach", Oct. 4, 2006.

Naor et al., "A Simple Fault Tolerant Distributed Hash Table", Feb. 2003.

Day et al., "A Model for Presence and Instant Messaging", RFC 2778, Feb. 2000.

International Search Report for PCT/US06/05696; Mailed Nov. 23, 2007.

Stolowitz Ford Cowger LLP, Listing of Related Cases; Jan. 5, 2011.

* cited by examiner

TECHNIQUES FOR DETERMINING COMMUNICATION STATE USING ACCELEROMETER DATA

CROSS REFERENCE TO RELATED APPLICATION

This application is a continuation of U.S. patent application Ser. No. 11/052,020 filed Feb. 5, 2005, now U.S. Pat. No. 7,764,641 entitled TECHNIQUES FOR DETERMINING COMMUNICATION STATE USING ACCELEROMETER DATA, the disclosure of which is incorporated herein by reference in its entirety.

BACKGROUND OF THE INVENTION

1. Field of the Invention

The present invention relates to using accelerometer data to determine communication state of a user on a network.

2. Description of the Related Art

Networks of general purpose computer systems connected by external communication links are well known and widely used in commerce. The networks often include one or more network devices that facilitate the passage of information between the computer systems. A network node is a network device or computer system connected by the communication links. An "end node" is a node that is configured to originate or terminate communications over the network. An "intermediate network node" facilitates the passage of data between end nodes.

Persons use networks to communicate in any of various ways, including by voice and multimedia over analog and digital telephone networks. Communications mechanisms using computer networks include file transfer, web page viewing, electronic mail ("email"), on-line chat, chat-rooms, shared digital logs (blogs), instant messaging, voice over IP, and audio or video or multi-media streaming, among others. Many of these communication mechanisms involve a "client" process operating on the person's local computer exchanging data with a "server" process operating on a remote computer on the network.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. Network nodes are often hosts for client and server processes. The term "server" is conventionally used to refer to the process that provides the service, or the host computer on which the process that provides the service operates. Similarly, the term "client" is conventionally used to refer to the process that makes the request, or the host computer on which the process that makes the request operates. As used herein, the terms "client" and "server" refer to the processes, rather than the host computers, unless otherwise clear from the context. In addition, the server process can be broken up to run as multiple processes on multiple hosts (sometimes called tiers) for reasons that include reliability, scalability, and redundancy, but not limited to those reasons.

Some communications, such as viewing web pages and email, are delayed communications that are completed at a later time when a second person signs on to the network to receive the communication. It is becoming more common for communications to be relatively immediate with multiple exchanges. Such communications require the presence of the remote party on the network. With the proliferation of networks, a person absent on one network (an enterprise private network) might be present on another network (e.g., a cellular telephone network or the public Internet).

Presence data is used in several extant and emerging applications. For example, in instant messaging applications, such as AOL Instant Messenger (AIM) from America Online of Dulles, Va. and PresenceWorks of PresenceWorks, Inc in Alexandria Va., presence data indicates the instantaneous knowledge that someone is available online and reachable via instant messaging.

More broadly, presence data indicates a dynamically changing set of channels, capabilities, characteristics, preferences and ability for remote persons to communicate and interact with each other over a network at the current time. Thus in the following, the terms "presence" and "present communication state" are used interchangeably. See for example the document identified as request for comments (RFC) 2778 found at a website of the Internet Engineering Task Force (IETF) found at domain ietf.org. The entire contents of RFC 2778 are hereby incorporated by reference as if fully set forth herein.

Presence data includes such present communicative states of availability as "online," "offline," "do not disturb," "at lunch." Some applications consider other availability information as presence data, including information that indicates, for a particular person, "try mobile phone first, then business line", "always send e-mail" or "unavailable for conference calls, but available for webcasts." In some applications, presence data may include physical location of the person such as "on travel in London," or "at home," or "in office" or "at company headquarters," as well as a network address.

In some applications, presence data indicates people on the same (virtual) location like a web page or a shared document at the same time. In some applications, presence data indicates people who are within the same cell (the geographical area covered by a cellular phone antenna). In some applications, presence data indicates location of a person or facility based on a positioning system, such as the Global Positioning System (GPS) widely used in commerce and by the military. Geographic position is a communication state in the sense that one person is within sight or earshot of another person or node on the network.

As used in the following, presence data indicates the communication state for a person at the current time and includes all sources of such information, no matter how precise or reliable, including a person's planned location or communicative state in a calendar database for the current time. Predicted future communication states and recorded past communication states are communication states that are not considered within presence data.

Most applications that use presence data require a human user to manually input data so the application can more accurately infer the human user's state. For example, even after the human user logs onto an instant messaging service (which usually requires manual input but can be automated), the service does not know whether the user is sitting at a desk and looking at the host's display device or not. The system infers that the user is present and attentive if the user has recently typed any information using the keyboard. The system assumes the user is idle if no keys are pressed for several minutes. An idle user may be in the room attentive to a video or audio display on the host but doing some other activity, such as reading a paper or talking on a telephone. Alternatively, the user may be gone away from the host and in no situation to respond to network communications presented at that host during that time. To distinguish the two cases, the user must manually input data that indicates the user is leaving the vicinity of the network node and may be expected back in an estimated amount of time (e.g., out to lunch, "2 hour meeting," "on vacation," etc.) In these systems, the communicative state of a user is determined by manual input.

While requiring manual input to infer communicative state is useful in many circumstances, there are ever more circumstances in which such manual input is inconvenient or impossible. For example, a cellular telephone is turned on, but another user of the cellular telephone network has no information about whether the cellular telephone owner is available to communicate using the cellular telephone. The other user must cause the telephone to ring, wait for no response, and infer that the owner is unavailable, wasting time better spend contacting an alternate person who is available to talk. It is inconvenient for the cellular telephone owner to constantly press keys to notify the network that not only is the cellular telephone on, but the owner is currently available for communications using it.

Some emerging systems would benefit even more than the cellular telephone system from communication state data that does not require manual input. For example, mobile ad hoc networks (MANets) involve mobile wireless routers that network with other fixed or mobile wireless routers with which they come into transmission range. The mobile routers can be carried by humans, animals or vehicles, including robots, to interface multiple electronic devices also carried. MANets have applications in tactical police and military and emergency medical services scenarios, including Search and Rescue. The mobile routers feed information to various control interfaces for the vehicles or various display elements for a human user or stimuli for animals. The routers also receive and transmit to the network information from various sensors or input devices operated by the user, such as the person, an animal or the vehicle. The MANets allow different units to share more information more quickly so that the multiple units can proceed as a coordinated whole.

If a particular human, animal, or vehicular user of the mobile router loses the capacity to coordinate actions with the other units, then the other units would want to be made aware of this change in availability of that particular user. In some circumstances, communications with the particular user would be affected, that is the communication state of the user has changed. In some circumstances, the user would be unable to provide manual input to signal the change. For example, an animal or an injured human or a maximally active human might not be able to provide needed manual input. Communications are affected, for example, because if a particular user is unable to move, communications involving the user's motion are wasteful of scare network resources. If a person is unconscious, then the person is incommunicado regardless of the integrity of the person's electronic equipment. If a user is highly active dealing with a crisis, such as a burning home or hostile gunfire, the user is not available for non-crucial communications and is too busy to report this change in availability until the crisis has diminished.

The change in the communication state of the user leads to a change in the types of communication that should be used. In some circumstances, tactical communications might be dropped and replaced with diagnostic communications to determine what is wrong with that particular user. A pulse sensor for a living user might be interrogated. Various computerized systems or sensors on a vehicle would be interrogated. If remedial activity by the user could be determined, then it would be beneficial to transmit information conveying the remedial activity to the user on a channel the user is expected to receive (such as audio if the person is too consumed by crisis to view video).

In some circumstances, the user could become captured by hostile forces, and the information carried through the MANet can be compromised. It would be desirable to know that the person's use of the network has changed, i.e., the communication state for network communications has changed, even though the person is unable to make any manual entries. As a result of this change in communication state, it would be desirable to stop transmitting sensitive information and delete all sensitive information stored on the devices carried by the person.

Based on the foregoing, there is a clear need for techniques to determine the communicative state of users of network nodes without manual input from the users and to communicate with the user based on the communicative state.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for communicating with a user on a network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In various embodiments, accelerometer data is used to infer communicative state of a network user. Among other uses, such techniques allow a network communicating with a human through a mobile node carried by the human to infer from stopped or unusual motions that the human's ability to receive or act on communications is impaired or otherwise affected.

For purposes of illustration, embodiments of the invention are described in the context of a MANet used by a military force, but the invention is not limited to this context. In other contexts, other networks, including cellular telephone networks apply techniques of the present invention to support the same or different services.

1. Structural Overview

Figure 1:
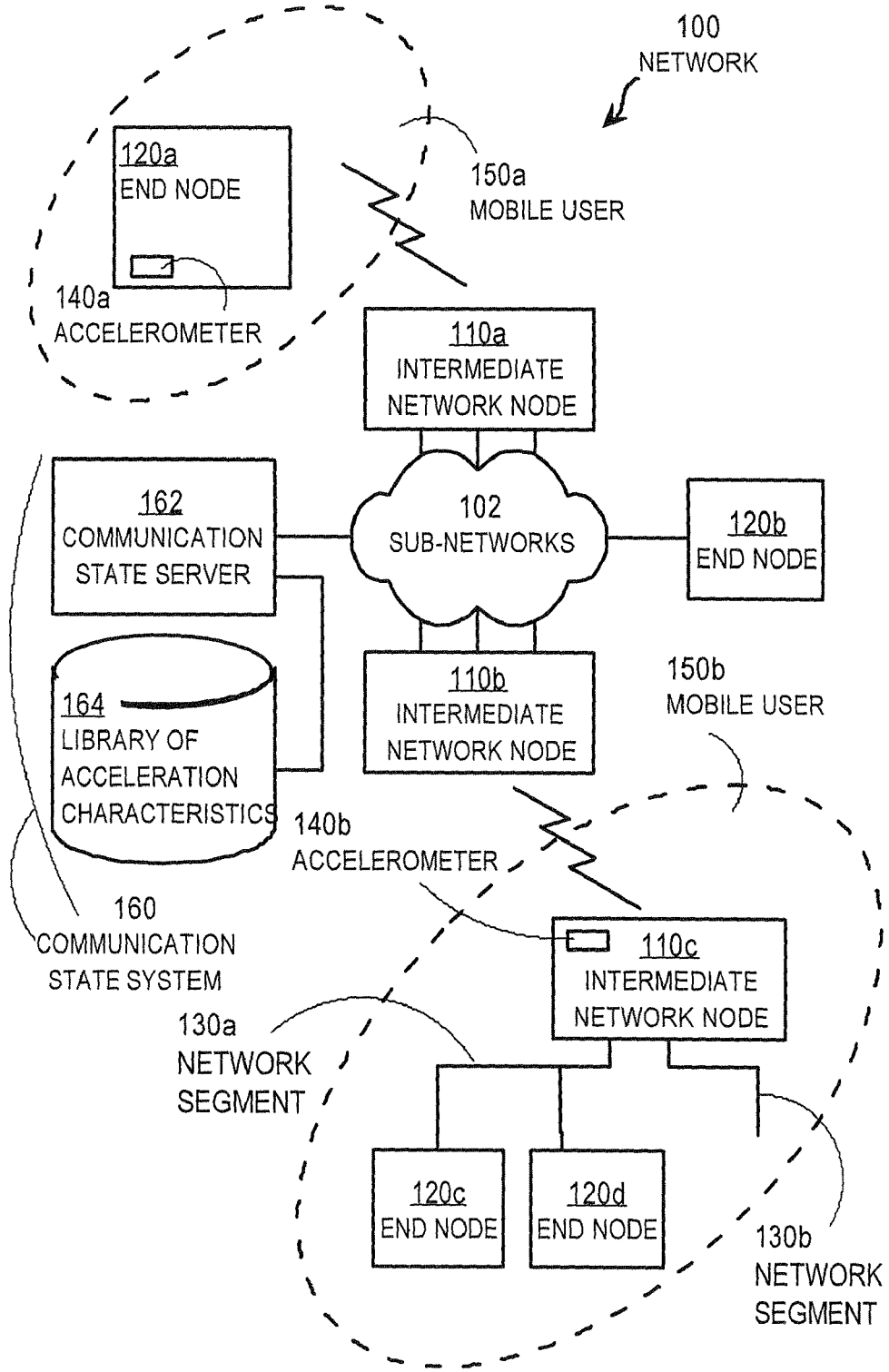
FIG. 1 is a block diagram that illustrates a network with data and servers for communicating based on communication state, according to an embodiment.

FIG. 1 is a block diagram that illustrates a network 100 for communicating with users, according to an embodiment. The network 100 includes one or more subnetworks 102, intermediate network nodes 110a, 110b, 110c (collectively referenced hereinafter as intermediate network nodes 110) connected to one or more network segments (e.g., network segments 130a, 130b) with end nodes 120a, 120b, 120c, 120d (collectively referenced hereinafter as end nodes 120). The network 100 includes communication state system 160, described in more detail below. One or more mobile network nodes are carried by users, such as users 150a, 150b (collectively referenced hereinafter as users 150).

The subnetworks 102 include any network that connects a variety of users of host computers, including, but not limited to, local area networks (LANs), wireless networks, wide-area networks (WAN), the Internet (a network of heterogeneous networks using the Internet Protocol, IP), and virtual private networks. For the purposes of illustration, four end nodes 120a, 120b, 120c, 120d and three intermediate network nodes 110a, 110b, 110c are shown in FIG. 1. In other embodiments more or fewer end nodes and intermediate network nodes are included in network 100.

For purposes of illustration, mobile end node 120a is carried by user 150a and communicates by a wireless link with intermediate network node 110a. For example, user 150a carries a laptop computer with a wireless network interface card as end node 120a. As another example, user 150a carries a cellular telephone that has a wireless link with a cellular tower that connects to an intermediate cellular network node 110a.

Also for purposes of illustration, mobile intermediate network node 110c is carried by mobile user 150b and communicates by a wireless link with intermediate network node 110b. Mobile network node 110c is also connected to network segments 130a, 130b that are carried by user 150b. A network segment is a portion of a network that does not include an intermediate network node. Network segment 130a connects mobile intermediate network node 110c to mobile end nodes 120c, 120d that are also carried by user 150b. For example, a military troop carries a personal router as intermediate network node 110c connected by one network segment 130a to a wearable computer as one end node 120c and a digital camera 120d as a second end node 120d. On network segment 130b, intermediate network node 110c is connected to other end nodes (not shown) such as a controller for an ear-piece and heads-up display and a global positioning system (GPS) end node. In other embodiments, more or fewer users carry more or fewer network nodes and rework segments.

According to the illustrated embodiment, at least one mobile node carried by a user 150 includes an accelerometer. For example, mobile end node 120a includes accelerometer 140a, and mobile intermediate network node 110c includes accelerometer 140b. In other embodiments, more or fewer or different mobile network nodes include an accelerometer.

Accelerometers are devices that measure acceleration, i.e., changes in speed or direction experienced by the accelerometer. Digital accelerometers of small size and power requirements with a wide variety of sensitivities and frequency responses are available commercially. Some small size accelerometers are micro-electromechanical systems (MEMS) accelerometers fabricated using techniques of integrated circuits. See for example accelerometers described at the time of this writing at the Internet sites of, among others, Honeywell electronics (document index.shtml at web domain inertialsensor.com), or Silicon Design Inc (documents index.html and tech.html at web domain silicondesigns.com) or the Center of Wireless Integrated Microsystems (WIMS) at the University of Michigan (document Trans03.pdf in directory /~jchae/pdf/ at web domain eecs.umich.edu), the entire contents of each of which are hereby incorporated by references as if fully set forth herein. Among these accelerometers the capability is provided for measuring accelerations as small as one hundred thousandth of g, where g is the acceleration of gravity, about 9.8 meters per second per second ($m/s^2$), to accelerations as large as thousands of g, on time scales increasing from about a hundredth of a second.

Accelerometers are widely known and used in mobile devices to monitor or control operation of such devices. For example, accelerometers are used in automobile air-bag systems to detect crash conditions suitable for deploying an air bag. In another example, an accelerometer is used in a mobile computing device with a magnetic hard disk, such as a laptop computer. The accelerometer detects a dropped device so the hard disk controller can retract read heads from the hard disk surface and lock the hard disk from rotating. These responses reduce or avoid damage to the hard disk and the data stored on it when the dropped device hits the ground or some other surface. Accelerometers are also used to detect and monitor vibrations in heavy equipment and vehicles. To applicants' knowledge, no accelerometers are used or proposed to determine presence on a network.

The network 100 includes the communication state system 160, which determines the communication state of users at the end nodes of the network 100, such as users 150a, 150b and a user (not shown) of stationary end node 120b. The communication state system 160 includes a communication state server 162 and a library 164 of data that indicates acceleration characteristics on one or more storage devices. The communication state server 162 determines communication state of one or more users based on acceleration data and controls the storage and retrieval of acceleration characteristic data in library 164. For purposes of illustration, communication state server 162 is shown separate from nodes 110, 120; but in some embodiments, communication state server 162 resides in part or in whole on one or more of nodes 110, 120 or other nodes (not shown) of subnetworks 102. Furthermore, for purposes of illustration, one communication state server 162 is connected to one storage device with library 164, but in other embodiments, the library may be distributed over several data storage devices connected directly to one or more communication state servers like server 162, or connected indirectly to one or more servers through sub-networks 102. Any communication state system known in the art may be modified to serve as communication state system 160. In various embodiments, network 100 includes more or fewer communication state systems like system 160.

The library 164 of acceleration characteristics associates spectral or statistical characteristics of acceleration data with corresponding user activities. For example, the library 164 includes data that indicates a first set of acceleration amplitude ranges in certain acceleration frequency bands that is uniquely associated with human walking motion. As a further example, the library 164 includes data that indicates a second set of acceleration amplitude ranges in different acceleration frequency bands that is uniquely associated with human running motion. As a still further example, the library 164 includes data that indicates a third set of acceleration amplitude ranges in different acceleration frequency bands that is uniquely associated with off-road travel by a land vehicle in certain terrain.

For example, in a second illustrated embodiment, a definition is developed for a user "activity state" by modeling that state as a series of motion events. Each motion event is characterized as a vector including a duration of time, a positive acceleration event onset in each of three directions, a maximum velocity event maturity in each of three directions, and a negative acceleration (deceleration) event conclusion in each of three orthogonal directions. The orthogonal directions can be expressed in Cartesian, spherical, or other coordinates. A "running" activity state is then associated with some series of motion event vectors. Similarly, a "walking," "riding," "stationary" or other activity state is associated with a series of different motion event vectors, as described in more detail in the next section with reference to FIG. 3. In other embodiments, a motion event is a vector expressing duration, acceleration, maximum velocity and deceleration in two dimensions, such as in a Cartesian plane or using polar coordinates, or in one dimension, such as acceleration magnitude and speed.

2. Method of Using Accelerometer Data for Presence

Figure 2:
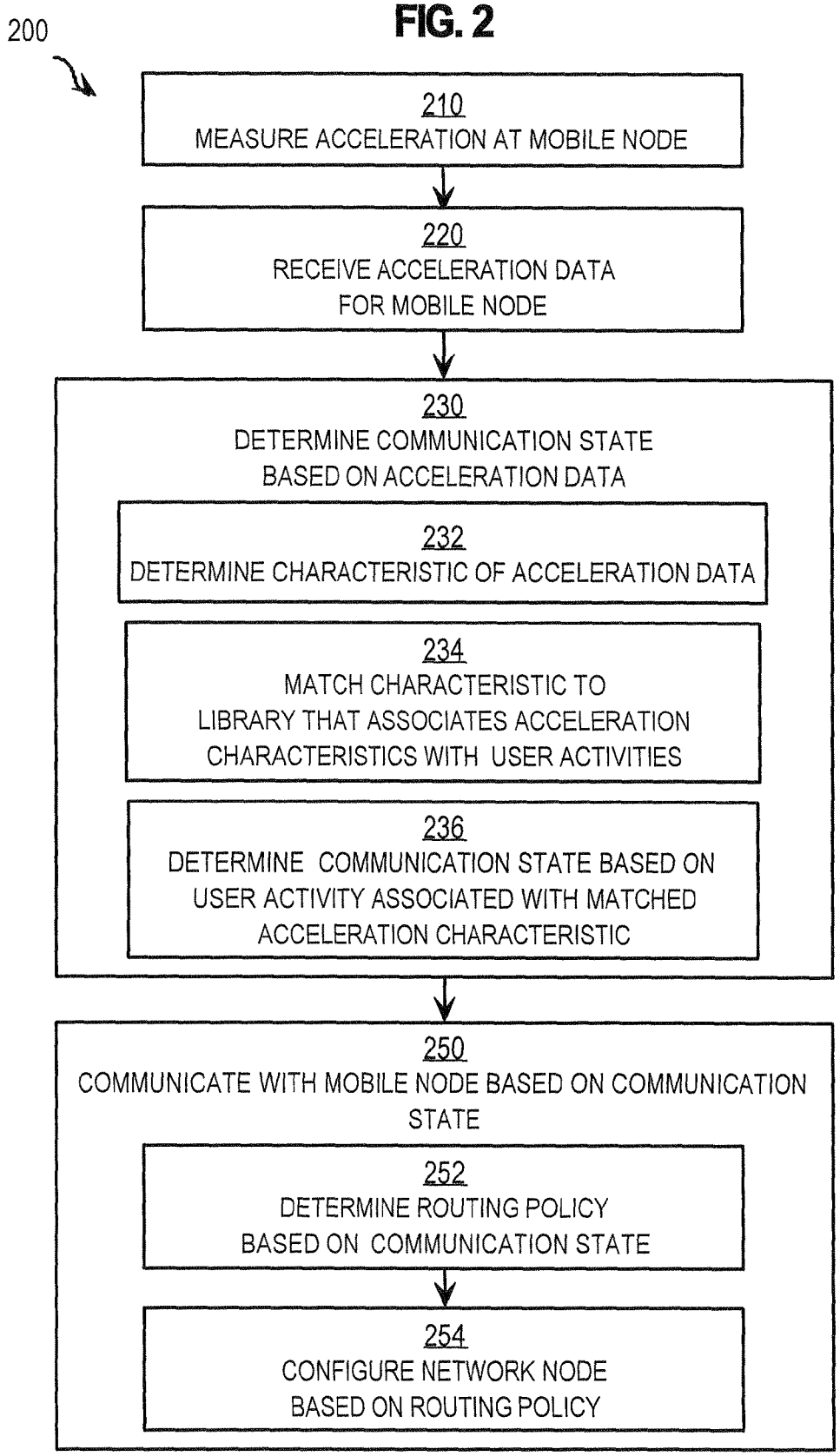
FIG. 2 is a flow diagram that illustrates at a high level a method for communicating based on communication state, according to an embodiment.

FIG. 2 is a flow diagram that illustrates a method 200 for communicating with a user on a network based on accelerometer data, according to an embodiment. Although steps are indicated in a particular order in FIG. 2, in other embodiments, the steps may be performed in a different order or overlapping in time, or one or more steps may be omitted, or changed in some combination.

In step 210, acceleration is measured at a mobile node by an accelerometer to produce raw acceleration data. As used here, the term "raw" acceleration data means the acceleration data output by the accelerometer. In some embodiments raw data is an analog signal (such as provided by the amplitude or frequency of a voltage signal). In some embodiments, raw data is a digital signal, such as an eight binary digit (bit) value that represents acceleration for a particular time interval (e.g., one hundredth of a second).

For example, in some embodiments during step 210, acceleration is measured at accelerometer 140a on a cellular telephone serving as end node 120a carried by user 150a. In some embodiments acceleration is measured at accelerometer 140a on a hard disk drive in a mobile computer with a wireless network card that serves as end node 120a carried or worn by user 150a. As another example, an accelerometer 140b is included in a personal router that serves as intermediate network node 110c on a heavily instrumented human, animal or vehicular user 150b. In some embodiments, the network node that includes the accelerometer processes the raw acceleration data to produce processed acceleration data.

Any processing of raw acceleration data known in the art at the time an embodiment of the invention is implemented may be used. For example, in various embodiments the raw data is digitized, averaged over longer time intervals, filtered, calibrated, Fourier transformed to produce one or more spectral characteristics, statistically processed to produce one or more other statistical characteristics, or processed in some combination of these ways to produce the processed acceleration data. In some embodiments, the processed data consumes much less data storage space than the raw acceleration data and can be transmitted over network 100 while consuming substantially fewer network resources than transmitting the raw acceleration data.

Figure 3:
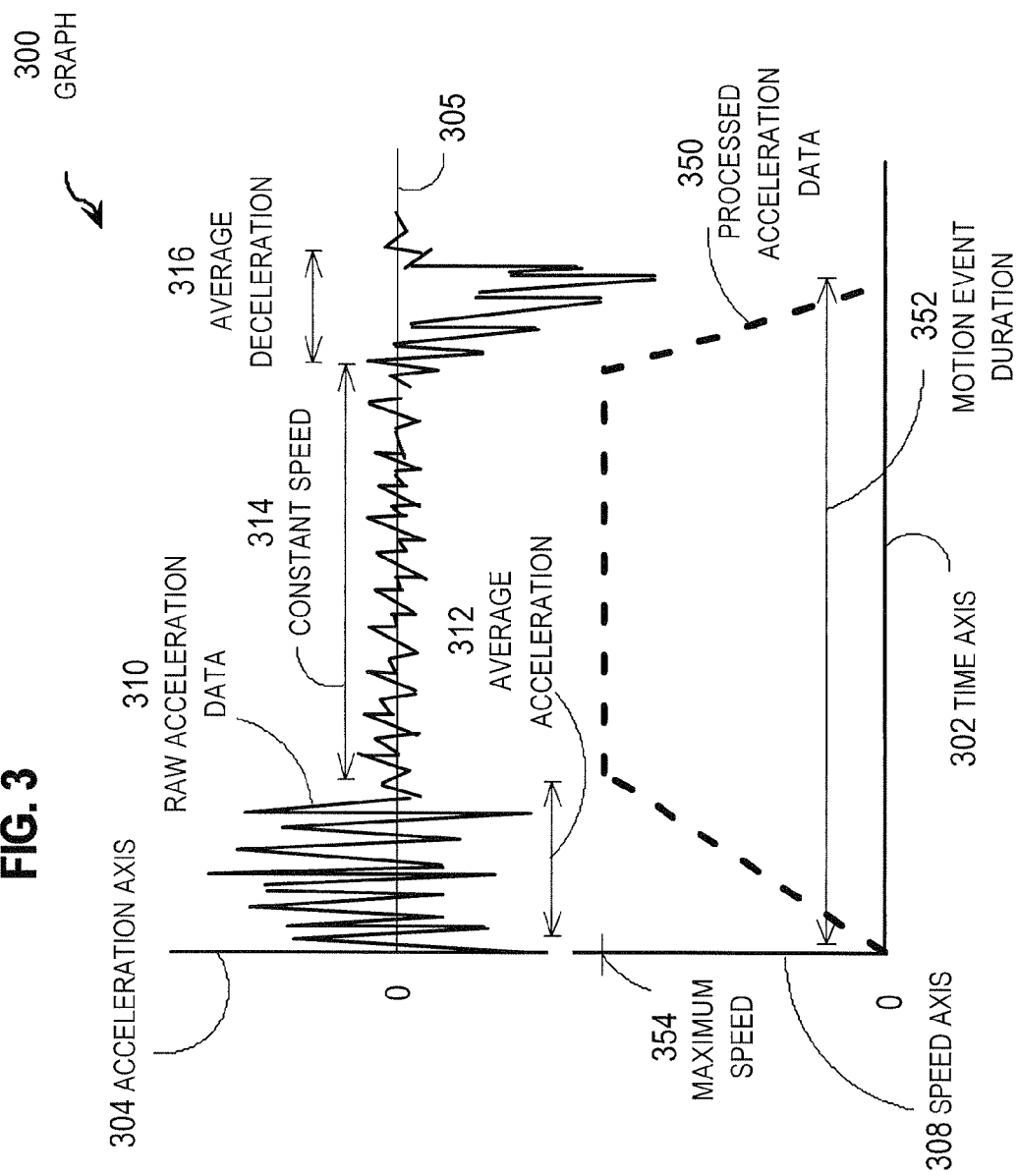
FIG. 3 is a graph that illustrates raw and processed acceleration data, according to an embodiment.

For purposes of illustration, it is assumed that the raw and processed acceleration data for one direction are as depicted in FIG. 3. FIG. 3 is a graph 300 that illustrates traces 310, 350 of raw and processed acceleration data, respectively, according to this illustrated embodiment. The horizontal axis represents the time axis 302, in arbitrary units, for both traces 310, 350. Two vertical axes are used. One vertical axis represents an acceleration axis 304 in arbitrary units for the trace 310 of raw acceleration data. The horizontal line 305 indicates a zero acceleration value. A second vertical axis represents a speed axis 308 in arbitrary units for the trace 350 of processed acceleration data. The time axis 302 indicates a zero speed value.

The trace 310 of raw data represents the raw acceleration data produced by an accelerometer, e.g., accelerometer 140b. The data includes a time of the trace (e.g., a start time for time axis 302) elapsed time along axis 302, and acceleration over a sample time scale for each of multiple samples. It is assumed for purposes of illustration that the sample time scale is short compared to the time for a user activity to evolve. In some embodiments, the raw acceleration data includes a location (not shown) or velocity (not shown) derived from integrating the acceleration values over time, or both. As can be seen in FIG. 3, the trace 310 of raw acceleration data shows a time extent of variable but predominantly positive acceleration indicated by the line segment 312 labeled "average acceleration." This time extent represents a time of average positive acceleration, during which speed is increasing in the direction associated with this raw data. As also can be seen in FIG. 3, the trace 310 of raw acceleration data shows a time extent of variable but predominantly negative acceleration indicated by the line segment 316 labeled "average deceleration." This time extent represents a time of average negative acceleration, during which speed is decreasing in the direction associated with this raw data. As also can be seen in FIG. 3, the trace 310 of raw acceleration data shows a time extent of less variable but near zero acceleration indicated by the line segment 314 labeled "constant speed." This time extent represents a time of average zero acceleration, during which speed is constant at some maximum value in the direction associated with this raw data.

The trace 350 of processed acceleration data represents the processed acceleration data produced by a processor, e.g., in end node 120c, plotted as speed versus time. The data includes a time of the trace (e.g., a start time for time axis 302) elapsed time along axis 302, and speed deduced from average acceleration over the time period of average acceleration 312, average acceleration over the time period of constant velocity 314, and average acceleration over the time period of average deceleration 316. The processed data also includes motion event duration 352 from the beginning of the period of average acceleration to the end of the period of average deceleration. In some embodiments, the processed acceleration data includes a location (not shown). As can be seen in FIG. 3, the trace 350 of processed acceleration data shows a linear increase in speed during the time extent of average acceleration. As also can be seen in FIG. 3, the trace of processed acceleration data shows a linear decrease in speed during the time extent of average deceleration. As also can be seen in FIG. 3, the trace of processed acceleration data shows a constant speed during the time extent of constant speed. During this time, the speed is at some maximum value in the direction associated with this raw data, as indicated by the maximum speed tick mark 354 on the speed axis 308. The duration, average acceleration, maximum speed, and average deceleration for the motion event vector are derived from the processed data.

In step 220, acceleration data for a mobile node is received at a communication state server 162. In various embodiments, the acceleration data received in step 220 is raw or processed acceleration data or both.

For example, in some embodiments, a communication state server 162 resident on end node 120a receives raw acceleration data from accelerometer 140a. In an illustrated embodiment, a computer serving as end node 120a, receives raw acceleration data produced by accelerometer 140*a* and generates processed acceleration data which is sent to and received by communication state server 162 on a different node of the network 100. In some embodiments, a communication state server 162 resident on end node 120*c* receives raw acceleration data from accelerometer 140*b* across network segment 130*a*. In some embodiments a computer serving as end node 120*c*, receives raw acceleration data from accelerometer 140*b* and generates processed acceleration data, which is then sent to and received by communication state server 162 on a different node of the network 100. In an illustrated embodiment, intermediate network node 110*c* receives raw acceleration data from accelerometer 140*b* and generates processed acceleration data, which is then sent to and received by communication state server 162 on a different node of the network 100.

In step 230, communication state is determined based, at least in part, on the acceleration data received. The communication state indicates a type of network communication suitable for communicating with the user.

For example, in some embodiments, one communication state indicates that the user is walking and in possession of a cell phone. This communication state indicates that a call on a cell phone is an appropriate network communication, but that an instant message to the person's desktop computer is not appropriate for the user's current state. The portion of the communication state that indicates that the user is walking is based on the acceleration data and makes it unlikely that the person is within view or hearing range of the user's desktop computer.

In some embodiments, one communication state indicates that the user is walking and in possession of both a laptop computer and a beeper. This communication state indicates that a call on the beeper is an appropriate network communication, but that an instant message to the person's laptop computer is not appropriate for the user's current state. The portion of the communication state that indicates that the user is walking is based on the acceleration data and makes it unlikely that the person currently has the laptop deployed for viewing.

In an illustrated embodiment, one communication state indicates that the user 150*b* is unconscious and in possession of a personal router (serving as intermediate network device 110*c*) connected to wearable computer (serving as end node 120*c*) and a digital camera (serving as end node 120*d*) on network segment 130*a* and a controller for an ear-piece and heads-up display and a global positioning system (GPS) end node on network segment 130*b*. The user is determined to be unconscious based on the acceleration data that indicates either no movement at all, or movement that is entirely due to a land vehicle moving over terrain in the user's vicinity, as determined by the GPS. This communication state indicates that a loud signal on the ear-piece is an appropriate network communication to possibly rouse a sleeping troop, if warranted, but that a visual message to the troop's heads-up display is not appropriate for the user's current state. If the user does not respond to the ear-piece signal, then the user's state is changed, to injured-unconscious to indicate that the troop could not be roused by a loud audio signal to the troop's ear-piece.

In an illustrated embodiment, the communicative state is determined from a group including, among others, communication states that indicate a combination of one or more of the following states: a persistently motionless living user who is not likely to be available for most network communication; a passive passenger living user who is moving only passively with a moving vehicle and who is not likely to be available for most network communication; a mildly active (e.g., shifting, head or hand moving) living user who is likely to be available for any network communication; a moderately active (e.g., walking) living user who is likely to be available for some network communication; a strongly active (e.g., running) living user who is likely to be available only for certain most crucial network communications; a normally functioning vehicular user that is likely to be available for normal network communications; and an abnormally functioning vehicular user that is likely to be available only for diagnostic network communications; an unreliable communication channel; and a network node with compromised security.

In another embodiment, the activity states are associated with communication states as follows. When the user activity state is stationary, then the user can receive e-mail. When the user activity state is moving very fast but not riding, then the user can receive voice calls. When the user activity state is moving fast by riding, then any form of short communications with the user is acceptable. When the user activity state is unexpectedly not moving, then open a voice call with a team member to check on the user. When the user activity state indicates a fast fall towards earth followed by a sudden stop, then an emergency call is placed to send emergency services to the user location. When the user activity state is moving fast, then reduce the packet size and data rate of IP packets to increase reliability. When the user activity state is moving slow, then increase packet size and data rate of IP packets to increase throughput.

Any method may be used to determine the communication state based on the acceleration data. In an illustrated embodiment, the server 162 maps activity state to network traffic types. In other embodiments, server 162 or another server (not shown) maps activity state to other meanings for other purposes. In the illustrated embodiment, the mapping associates an index table of "network address x" with "user y." Server 162 determines that "user y" is in "activity state z." Server 162 then determines that "suitable communications are types a, b or c". Thus, server 162 formulates and serves up communication state information for "user y" using library 164. For example, in some embodiments, server 162 determines proper forms of communications (e-mail, voice call, instant messenger (IM), pager, etc.).

In some embodiments, multiple different servers on the same or different node perform the functions of server 162. For example, an activity state server determines user y is associated with activity state z. A communications broker server associates user y with network addresses x1, x2, x3, x4 for a cell phone network, pager network, and various IP clients, and determines which of these addresses is best to use for the current activity state of the user y. In some embodiments, the communications broker uses other sources of "presence" information in making its determination, such as login information or the fact that the user just sent an IM message a few seconds earlier.

In other embodiments, step 230 includes predicting future communication states based on the acceleration data. For example, based on a current position of user 150*a* and rate of movement from the accelerometer data, the communication state server 162 determines that the user 150*a* is about to leave an area of coverage for wireless communications over intermediate network node 110*a*. In some embodiments, server 162 also determines that user 150*a* is expected to be incapable of reliable network communications in the near future because the measured accelerations perturb an orientation of an antenna used by end node 120*a* to communicate with intermediate node 110*a*. In some embodiments, server 162 also determines that user 150*a* is expected to be incapable of any network communication after that time. In some embodiments, server 162 also determines that user 150a is expected to come into better range of a different intermediate network node (e.g., intermediate network node 110b) when the user moves out of range of intermediate network node 110a.

In an illustrated embodiment, step 230 includes steps 232, 234, 236. In step 232, one or more characteristics of the acceleration data are determined. For example, in an illustrated embodiment, a histogram of half-second averaged accelerations accumulated over 45 seconds is determined based on the raw or processed acceleration data received in step 220 for the accelerometer 140b on personal router serving as intermediate network node 110c. In a second illustrated embodiment, a series of motion event vectors are determined.

In step 234, the characteristic of the acceleration data are matched to characteristics in a library of acceleration characteristics associated with different user activities. For example, the histogram computed in step 232 is compared to one or more histograms in library 164 that are associated with different human, animal and vehicular user activities. In a second illustrated embodiment, the series of motion event vectors are associated with a user activity state, such as "stationary," "walking," "running," "riding," "falling," etc.

In an illustrated embodiment, library 164 includes histograms for: an unconscious human user; a mildly active human user who is occasionally shifting weight or moving hands or arms; a moderately active human user who is walking; and a strongly active human who is running or moving a heavy load. In the illustrated embodiment, library 164 includes histograms for an unconscious animal user, a moderately active animal user, and a stressed animal user. In the illustrated embodiment, library 164 includes, for each of several vehicles, histograms for one or more normal operating conditions, including land operations over different types of terrain, and one or more abnormal operating conditions, such as immobilized vehicles, vehicles with damaged wheels or supports or structures, and collisions.

It is assumed, for purposes of illustration, that, during step 234, the histogram of half-second averaged accelerations accumulated over 45 seconds based on the raw or processed acceleration data from accelerometer 140b carried by human user 150b matches most closely a library histogram for a land vehicle moving over rocky, vegetation-sparse terrain. When the vehicular motion is subtracted because the user 150b is known to be a human, not a vehicle, the remaining signal matches most closely that of an unconscious human user.

In step 236, the current communication state is determined based, at least in part, on the user activity associated with the matched acceleration characteristic. For example, based on data (not shown) that associates intermediate node 110c with human user 150b, and based on the determination during step 234, a communication state is determined that indicates that the user 150b is unconscious and in possession of a personal router (intermediate network device 110c) connected to wearable computer (node 120c) and a digital camera (node 120d) on network segment 130a and a controller for an ear-piece and heads-up display and a global positioning system (GPS) end node on network segment 130b. In the second illustrated embodiment, the user activity state "unexpectedly not moving," indicates a voice call should be opened with a team member to check on the user, and packet size and data rate of IP packets should be increased to increase throughput.

In some embodiments, step 230 includes sending data that indicates the communication state to the mobile node. For example, step 230 includes sending data to mobile end node 120a that indicates that the node is moving out of range of intermediate network node 110a.

In step 250, communication with the mobile node is based on the communication state. For example, in some embodiments, if the communication state indicates an abnormally functioning vehicle, then step 250 includes providing reduced services to a mobile network node on the vehicle and adding communications to interrogate diagnostic systems on the vehicle.

In the illustrated embodiment, communication with user 150b is effected by a loud signal on the ear-piece as an appropriate network communication to possibly rouse a sleeping troop, if warranted, because a visual message to the troop's heads-up display is not appropriate for the current communication state.

If the user 150b does not respond to the ear-piece signal, then the user's state is changed, to injured-unconscious that indicates that the troop could not be roused by a loud audio signal to the troop's ear-piece. In various embodiments, during step 250, communications with user 150b is suspended or diverted, depending on a protocol for the embodiment. In some embodiments, if the communication state indicates an injured human, then step 250 includes providing reduced services to a mobile network node carried by the human and adding communications to interrogate diagnostic systems for the human, such as sensors for pulse, blood pressure and body temperature of the human user.

In some embodiments, the communication state is determined to be compromised communications, based at least in part on the acceleration data. For example, if it is determined that m friendly vehicle is in the vicinity of the user 150b as determined by the GPS (not shown) on network segment 130b, then it can reasonably be inferred that the user 150b or user equipment 110c, 130a, 130b, 120c, 120d, or both, have been captured by hostile forces and are being transported by land vehicle over the specified terrain. In various embodiments, sensitive data is no longer communicated to intermediate network node 110c, or sensitive data stored on one or more nodes carried by user 150b (e.g., nodes 110c, 120c, 120d) is deleted, or both.

In some embodiments, step 250 includes sending data that indicates the communications state to the mobile node. For example, step 250 includes sending data to mobile intermediate network node 110c that indicates the compromised communication state. In response, one or more nodes carried by user 150b deletes sensitive data.

In some embodiments, a network node is configured based on the communication state. For example, based on a communication state that indicates unreliable communications, e.g., due to antenna accelerations at an outer range of a wireless intermediate network node such as node 110b, a network node is configured to use a reduced value for a network configuration parameter for a maximum size of data packets communicated over the network (e.g., the maximum transmission unit, MTU)

In the second illustrated embodiment, the user activity state "unexpectedly not moving," causes a voice call to be opened with a team member to check on the user, and causes packet size and data rate of IP packets to be increased to increase throughput.

In an illustrated embodiment, step 250 includes steps 252, 254. In step 252, one or more routing policies are determined based on the communication state. For example, in some embodiments, it is determined to use a network policy appropriate for unreliable communications. A network policy is a set of rules for routing data packets on a network. For example, a particular network policy for unreliable transmissions is determined base on the communication state.

In step 254, a network node is configured based on the routing policy. For example, network node 110b is configured to use a reduced value MTU as part of the particular network policy.

3.0 Implementation Mechanisms—Hardware Overview

Figure 4:
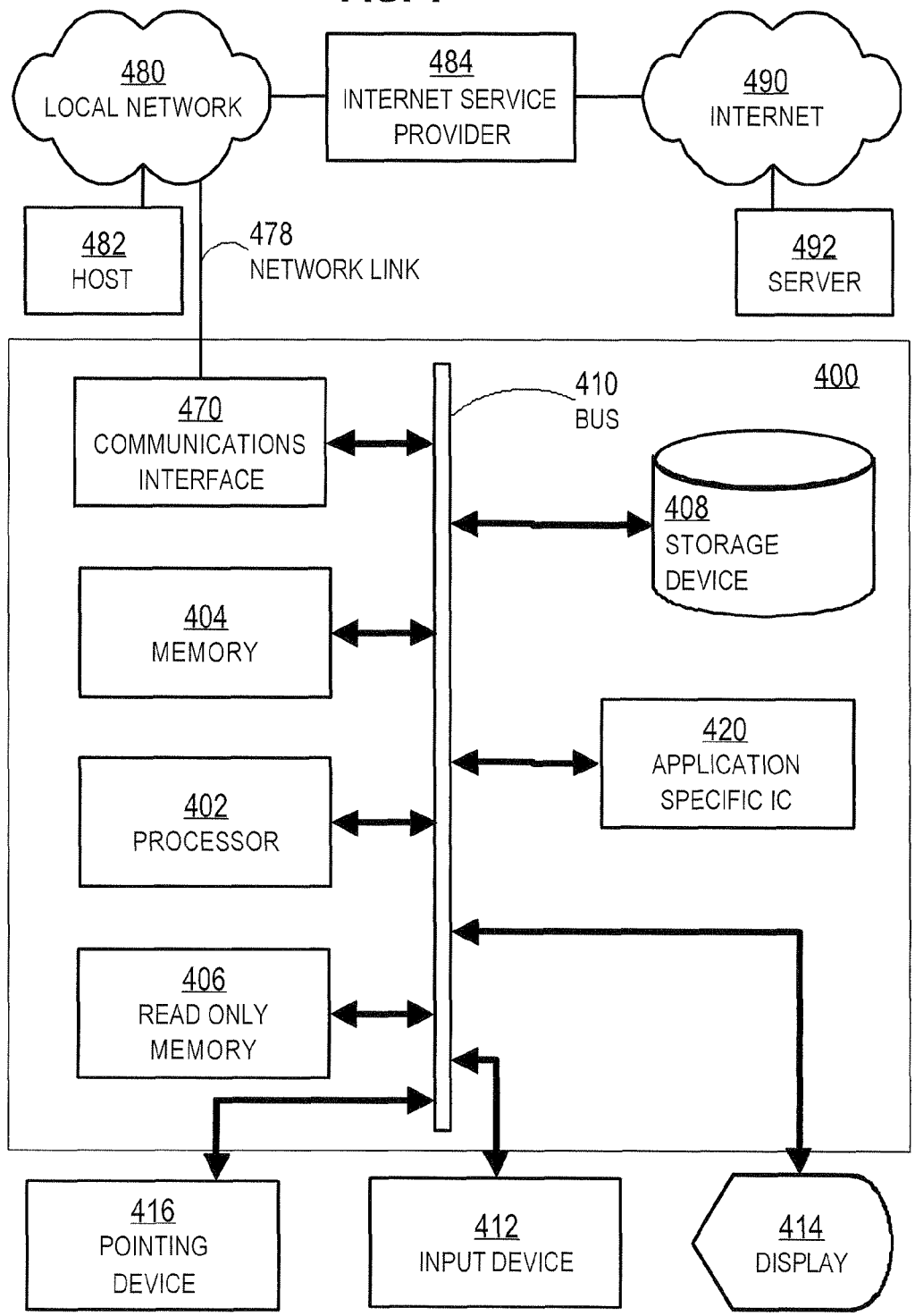
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

Information, including instructions, is provided to the bus 410 for use by the processor from an external input device 412, such as a keyboard containing alphanumeric keys operated by a human user, or a sensor. A sensor detects conditions in its vicinity and transforms those detections into signals compatible with the signals used to represent information in computer system 400. Other external devices coupled to bus 410, used primarily for interacting with humans, include a display device 414, such as a cathode ray tube (CRT) or a liquid crystal display (LCD), for presenting images, and a pointing device 416, such as a mouse or a trackball or cursor direction keys, for controlling a position of a small cursor image presented on the display 414 and issuing commands associated with graphical elements presented on the display 414.

In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 400 also includes one or more instances of a communications interface 470 coupled to bus 410. Communication interface 470 provides a two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, that carry information streams, such as digital data. Such signals are examples of carrier waves.

The term computer-readable medium is used herein to refer to any medium that participates in providing instructions to processor 402 for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 478 typically provides information communication through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides information representing video data for presentation at display 414.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420, may be used in place of or in combination with software to implement the invention. Thus, embodiments of the invention are not limited to any specific combination of hardware and software.

The signals transmitted over network link 478 and other networks through communications interface 470, which carry information to and from computer system 400, are exemplary forms of carrier waves. Computer system 400 can send and receive information, including program code, through the networks 480, 490 among others, through network link 478 and communications interface 470. In an example using the Internet 490, a server 492 transmits program code for a particular application, requested by a message sent from computer 400, through Internet 490, ISP equipment 484, local network 480 and communications interface 470. The received code may be executed by processor 402 as it is received, or may be stored in storage device 408 or other non-volatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A mobile device comprising:
an accelerometer located in the mobile device and configured to provide accelerometer data in response to a hand movement of the mobile device;
a user interface located in the mobile device; and
a processor configured to identify an acceleration condition of the mobile device based on the accelerometer data, wherein the processor is configured to output information from the user interface according to the acceleration condition.

2. The mobile device of claim 1 wherein the processor is configured to compare the accelerometer data to previously stored acceleration patterns and initiate an operation on the mobile device corresponding with one of the acceleration patterns that match the accelerometer data.

3. The mobile device of claim 1 wherein the processor is further configured to change the information output from the user interface in response to a predefined deceleration condition in the accelerometer data.

4. A mobile device comprising:
an accelerometer located in the mobile device and configured to provide accelerometer data associated with the mobile device;
a user interface located in the mobile device; and
a processor configured to change information output from the user interface in response to a characteristic of the accelerometer data, wherein the characteristic of the accelerometer data comprises at least one of a positive acceleration or a negative acceleration exceeding a defined threshold value.

5. The mobile device of claim 3 wherein the predefined deceleration condition comprises a change from a first speed value to a zero speed value within a defined time period.

6. The mobile device of claim 1 wherein the information output from the user interface includes visual messages.

7. The mobile device of claim 1 wherein the mobile device comprises a cellular telephone and the accelerometer data identifies acceleration of the cellular telephone.

8. The mobile device of claim 1 wherein the information output from the user interface includes a sound output from a speaker of the user interface.

9. The mobile device of claim 1 further comprising a communication interface configured to send the accelerometer data over a network to a server, wherein the processor is configured to change notifications output from the user interface according to messages sent back from the server responsive to the accelerometer data.

10. A computer-readable memory device having instructions stored thereon that, in response to execution by a processing system, cause the processing system to perform operations comprising:
receiving accelerometer data from an accelerometer located in a mobile device;
determining an acceleration characteristic of the mobile device based on the accelerometer data;
determining an acceleration direction of the mobile device based on the accelerometer data; and
operating the mobile device in response to the acceleration characteristic and the acceleration direction of the mobile device.

11. The computer-readable memory device of claim 10, further comprising:
sensing a hand movement based on the acceleration characteristic of the mobile device; and
operating the mobile device based on the hand movement.

12. The computer-readable memory device of claim 11 wherein operating the mobile device comprises sending text messages or email messages.

13. The computer-readable memory device of claim 10 wherein determining the acceleration characteristic comprises comparing the accelerometer data with stored acceleration patterns and operating the mobile device based on one of the acceleration patterns corresponding with the accelerometer data.

14. The computer-readable memory device of claim 10, wherein operating the mobile device comprises configuring a network node to support a type of network communication suitable for communicating with a mobile end node.

15. A computer-readable memory device having instructions stored thereon that, in response to execution by a processing the processing system to perform operations comprising:
receiving accelerometer data from an accelerometer in a mobile device;
sensing a type of user of the mobile device according to the accelerometer data;
operating the mobile device according to the type of user of the mobile device; and
changing a type of communication used by the mobile device to communicate through a user interface according to the type of user of the mobile device.

16. The computer-readable memory device of claim 10, wherein the operations further comprise reducing services in the mobile device according to the type of user of the mobile device associated with the accelerometer data.

17. A mobile device, comprising:
an accelerometer located in the mobile device and configured to generate acceleration data;
a processor configured to determine whether the mobile device is in motion or stationary according to the acceleration data; and
perform a first operation with the mobile device when the mobile device is in motion and perform a second different operation when the mobile device is stationary.

18. The mobile device according to claim 17 wherein the processor is configured to initiate a call operation with the mobile device according to the acceleration data.

19. The mobile device according to claim 17 wherein the processor is configured to determine a pulse, blood pressure, or body temperature of the user responsive to the acceleration data.

20. The mobile device according to claim 17 wherein the processor is configured to detect hand or arm movements based on the acceleration data and perform the first operation based on the hand or arm movements.

21. The mobile device according to claim 17 wherein the processor is further configured to change what information the mobile device communicates through a user interface according to the acceleration data.

22. The mobile device according 17 wherein the processor is further configured to change to a different device or change to a different interface for communicating according to the acceleration data.

23. A mobile device, comprising:
an accelerometer located in the mobile device and configured to generate acceleration data; and
a processor configured to:
sense the mobile device accelerated in different directions according to the acceleration data; and
perform different operations on the mobile device according to the different directions the mobile device is accelerated.

24. The mobile device according to claim 17 wherein the processor is further configured to:
derive a series of motion event vectors from the acceleration data, wherein the motion event vectors include a time duration, a positive acceleration event, and a negative acceleration event in different directions; and
sense different user activities according to the motion event vectors.

25. A mobile device, comprising:
an accelerometer located in the mobile device and configured to generate acceleration data; and
a processor configured to:
sense different user activities performed by a user with the mobile device according to the acceleration data, wherein the processor is further configured to:
compare the acceleration data with stored acceleration patterns;
identify one of the stored acceleration patterns that corresponds with the acceleration data;
identify one of the user activities corresponding with the identified one of the stored acceleration patterns; and
perform an operation in the mobile device based on the identified one of the user activities.

26. The mobile device according to 23 wherein the processor is further configured to detect different hand movements based on the acceleration data and perform the different operations in response to the detected hand movements.

\* \* \* \* \*

UNITED STATES PATENT AND TRADEMARK OFFICE
CERTIFICATE OF CORRECTION

| | | |
|---|---|---|
| PATENT NO. | : 8,116,719 B2 | Page 1 of 1 |
| APPLICATION NO. | : 12/788243 | |
| DATED | : February 14, 2012 | |
| INVENTOR(S) | : Gregory Pelton et al. | |

It is certified that error appears in the above-identified patent and that said Letters Patent is hereby corrected as shown below:

Column 17
claim 15, line 3, please insert --, cause -- before "the processing".

Signed and Sealed this
Twenty-third Day of October, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,116,719 B2 | Page 1 of 1 |
| APPLICATION NO. | : 12/788243 | |
| DATED | : February 14, 2012 | |
| INVENTOR(S) | : Gregory Pelton et al. | |

It is certified that error appears in the above-identified patent and that said Letters Patent is hereby corrected as shown below:

Column 17, line 16 (claim 15, line 3) please insert --, cause -- before "the processing".

This certificate supersedes the Certificate of Correction issued October 23, 2012.

Signed and Sealed this
Thirteenth Day of November, 2012

David J. Kappos
*Director of the United States Patent and Trademark Office*